C. W. DAVIS.
SATURATING ELEMENT FOR COOLING APPARATUS.
APPLICATION FILED JULY 31, 1917.
1,286,550.
Patented Dec. 3, 1918.
2 SHEETS—SHEET 1.
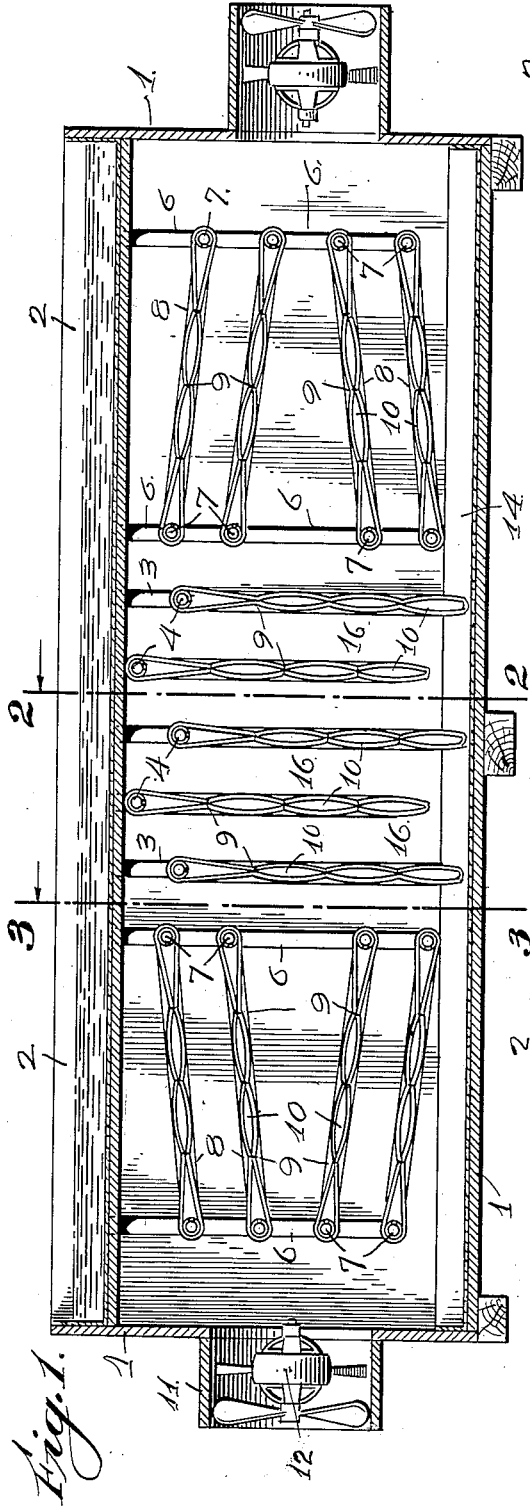
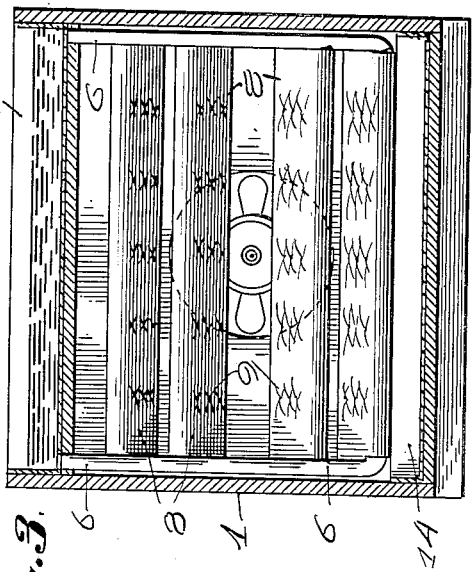
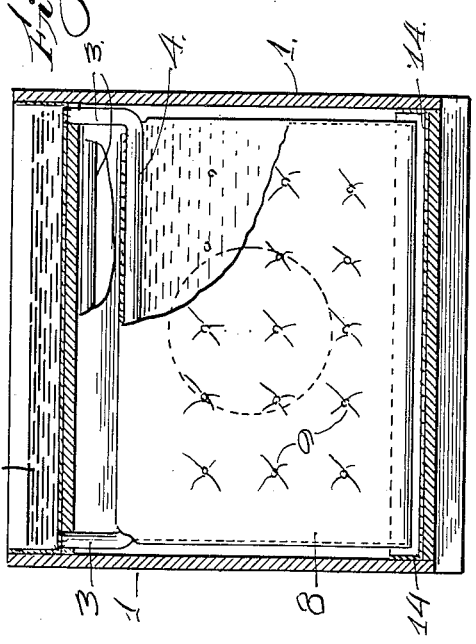
INVENTOR
Charles W. Davis.
BY
Arthur L. Slee.
ATTORNEY C. W. DAVIS.
SATURATING ELEMENT FOR COOLING APPARATUS.
APPLICATION FILED JULY 31, 1917.
1,286,550.
Patented Dec. 3, 1918.
2 SHEETS—SHEET 2.
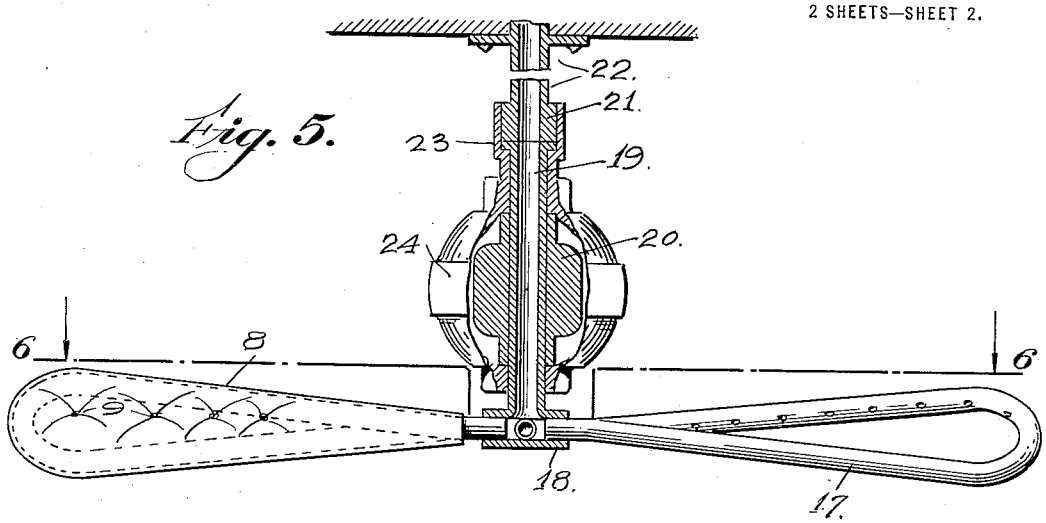
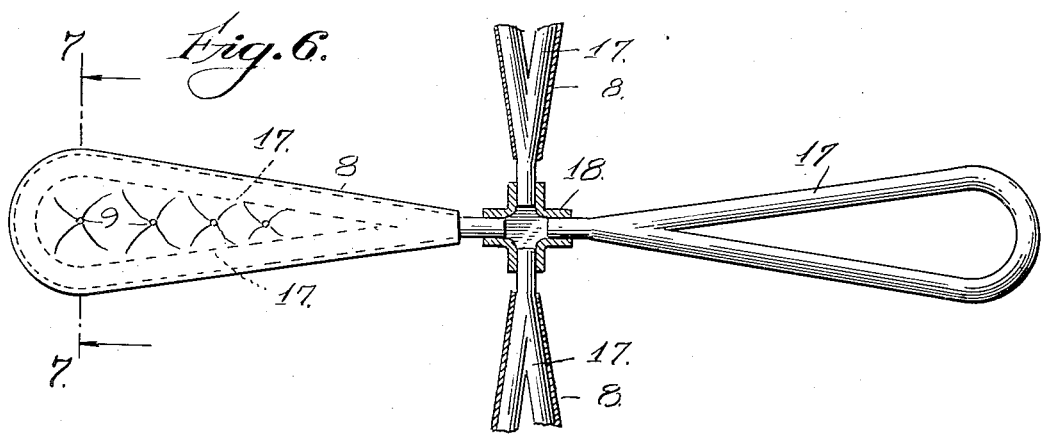
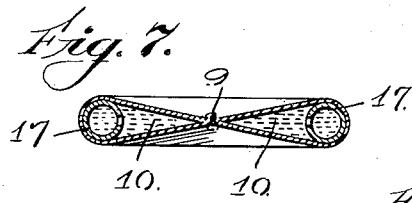
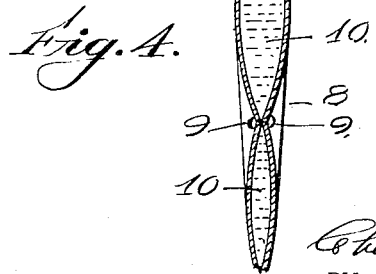
INVENTOR.
Charles W. Davis.
BY
Arthur L. Slear
ATTORNEY.

UNITED STATES PATENT OFFICE.

CHARLES W. DAVIS, OF SAUSALITO, CALIFORNIA.

SATURATING ELEMENT FOR COOLING APPARATUS.

1,286,550.  Specification of Letters Patent.  Patented Dec. 3, 1918.

Application filed July 31, 1917.  Serial No. 183,990.

*To all whom it may concern:*

Be it known that I, CHARLES W. DAVIS, a citizen of the United States, and a resident of the city of Sausalito, in the county of Marin and State of California, have invented a new and useful Improvement in Saturating Elements for Cooling Apparatus, of which the following is a full, clear, and exact description, such as will enable others skilled in the art to which it appertains to make and use the same.

My invention relates to improvements in cooling devices wherein atmospheric heat is utilized to evaporate water thereby reducing the temperature of the atmosphere and has to do with the construction and arrangement of the water containing elements.

The reduction in atmospheric temperature in cooling devices of the type referred to is in direct proportion to the amount of water evaporated within a given period and similarly the amount of water evaporated is in direct proportion to the area of the exposed water. The present invention has for its object the exposure of a maximum water saturated area within a minimum air space whereby a comparatively great saturated area is exposed to a comparatively small volume of air.

Another object of the present invention is to provide a saturated element adapted to convey the maximum amount of water or moisture to the exposed surfaces by capillary attraction by the employment of a pubescent container.

And a further object is to provide an element having intersecting interior channels to convey water to substantially every portion of the element to provide the greatest possible saturation.

It is also intended to provide a saturating means wherein the water pressure operating in conjunction with the attraction of gravity will cause a multiplicity of suspended particles or drops of water to be held within the air current to consume the heat from said current.

I accomplish these several objects by means of the preferred form of the device disclosed in the drawings forming a part of the present specification wherein like characters of reference are used to designate similar parts throughout the said specification and drawings, and in which—

Figure 1 is a longitudinal sectional view of a cooling apparatus disclosing my improved atmosphere saturating devices applied thereto;

Fig. 2 is a transverse sectional view taken on line 2—2 of Fig. 1 in the direction indicated disclosing the manner in which the elements are connected to a source of water supply;

Fig. 3. is a transverse sectional view taken on line 3—3 of Fig. 1 in the direction indicated disclosing the arrangement whereby approximately horizontal saturating elements are connected to a source of water supply;

Fig. 4. is an enlarged detailed sectional view of a portion of one of the saturating elements disclosing the manner in which the same is connected to one of the water pipes;

Fig. 5 is a modified form of the invention as applied to a ceiling fan;

Fig. 6 is a sectional view taken on line 6—6 of Fig. 5 in the direction indicated; and Fig. 7 is a sectional view taken through line 7—7 of Fig. 6.

Referring to the drawings the numeral 1 is used to designate a housing having a water trough 2 in the upper portion thereof. Connected with and suspended from the water trough 2 are several pipes 3 arranged in pairs and connected by means of horizontally disposed perforated connections 4 the purpose of which will hereinafter be more fully described.

A second series of vertically disposed water pipes 6 are also arranged in pairs, each pair being connected by several horizontally disposed perforated water pipes or connections 7.

Saturating elements or water containers 8, composed preferably of fabric or similar pubescent material, are strung between corresponding horizontal pipes 7 of the vertical pairs 6 and also suspended from the horizontal perforated pipes 4, each alternate pipe 4 being suspended at a slightly lower level than the remaining pipes in order to provide a tortuous channel 16 between the mats or elements 8 and extending throughout the length of the housing 1. That is, some of the pipes 4 are suspended at an elevation which will suspend their respective mats or elements 8 with their lower ends adjacent the bottom of the housing 1 and with the top ends of said mats or elements 8 spaced apart from the upper portion of said housing 1.

The corresponding horizontally disposed pipes 7 are arranged to slightly incline the elements 8 when strung thereon the purpose of which will be more fully described.

Each mat or element 8 is tufted at regular intervals as at 9 to reduce the capacity of said element as a container so that at no time will an excessive amount of water be stored therein and also to provide intersecting channels 10 by means of which water from the perforated pipes 4 and 7 may be conveyed to substantially every portion of the interior of said elements 8 from whence said water or moisture is conveyed by capillary attraction, owing to the pubescent nature of the elements 8, to the outer surface of the mats.

In the case of the slightly inclined mats it is evident that the static pressure operating in conjunction with the capillary attraction induced by the pubescent nature of the mats 8 will cause the lower side thereof to be super-saturated and thereby produce a plurality of suspended drops or particles of water hung directly within the path of an air current to remove a portion of the heat from said current by the vaporization process.

To provide the necessary current of air the housing 1 is provided at each end thereof with suitable ports 11 within which are mounted suitable fans or blowers 12.

The air current may be in either direction.

As the stationary moisture elements or mats 8 have their interiors directly connected to the perforated portions of the pipes 4 and 6, it is evident that moisture or water will be delivered by gravity to substantially all portions of the interiors of said mats or elements 8.

It is also obvious that capillary attractions will convey said moisture to the outer surfaces of the mats.

When the blowers 12 are operated to produce a current of air the outer saturated surfaces of the moisture laden elements 8 are directly exposed to said draft which during its passage through the channel 16 will give up a portion of its heat in evaporating the water thereby lowering the temperature of the air current in the well known manner.

The foregoing description is of stationary elements within a housing exposed to a confined draft of air. In Figs. 5, 6 and 7 I have illustrated modified forms wherein the saturated elements 8 are rotated or moved through the air within a room or compartment to obtain the same results.

In Figs. 5 and 6 the saturated elements 8, tufted as at 9 to prevent the production of a chamber of excessive or abnormal capacity and also to provide intersecting channels as hereinbefore mentioned, are mounted upon skeleton fan blades in the form of perforated pipes 17 connected to a cross 18 on the lower end of a vertically disposed hollow armature shaft 19 of a well known type of ceiling fan.

The armature 20 is secured to or mounted upon the hollow armature shaft 18 and is rotatably held in connection with the male member of stuffing gland 21 of a ceiling standard 22 by the female member 23 secured to the field magnet housing 24.

Water is conveyed through the ceiling standard 22 to the hollow armature shaft 19 and to the perforated pipes 17 and the interior of the mats or moisture laden elements 8.

As the blades are rotated through the atmosphere an air current is created relatively to the fan blades and the mats 8 thereof.

The speed of the blades should be insufficient to create a degree of centrifugal force which will cause the moisture to be thrown off from the ends of the fan blades.

As the blades rotate the resulting air currents will evaporate the moisture on the surfaces of the mats 8 and the heat consumed by such evaporation will cause a lowering of the temperature of said air currents.

I am aware that the present state of art discloses devices for removing heat from the atmosphere by the evaporation of water. I therefore do not claim such a device broadly but—

What I claim as new and desire to secure by Letters Patent is—

1. A device for lowering atmospheric temperature by evaporation of water comprising a fabric element having a series of channels to convey water to substantially all parts of said element.

2. A device for lowering atmospheric temperature by evaporation of water comprising a pubescent element having a series of channels to convey water to substantially all parts of said element whereby said water may be conveyed by capillary attraction to the outer surfaces of said element.

3. A device for lowering atmospheric temperature by evaporation of water comprising a hollow fabric mat tufted to provide a series of interior channels to convey water to substantially every part of said mat.

4. A mat for atmospheric cooling devices comprising a hollow fabric mat tufted to provide intersecting channels for conveying water to substantially every portion of the said mat.

5. A mat for atmospheric cooling devices comprising a hollow pubescent mat tufted to provide intersecting channels to convey water to substantially all portions of the interior of said mat whereby said water may be conveyed by capillary attraction to the outer surfaces of said mat.

In witness whereof I hereunto set my signature.

CHARLES W. DAVIS.